(12) United States Patent
Kawashima et al.

(10) Patent No.: US 12,443,585 B2
(45) Date of Patent: Oct. 14, 2025

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Shuhei Kawashima, Yokohama (JP); Xinyu Peng, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 401 days.

(21) Appl. No.: 17/885,661

(22) Filed: Aug. 11, 2022

(65) Prior Publication Data

US 2023/0267112 A1    Aug. 24, 2023

(30) Foreign Application Priority Data

Feb. 21, 2022  (JP) ................. 2022-024948

(51) Int. Cl.
*G06F 16/93* (2019.01)
*G06F 16/23* (2019.01)

(52) U.S. Cl.
CPC .......... *G06F 16/2358* (2019.01); *G06F 16/93* (2019.01)

(58) Field of Classification Search
CPC ............................ G06F 16/93; G06F 16/2358
See application file for complete search history.

(56) References Cited

U.S. PATENT DOCUMENTS

| 2001/0020239 A1* | 9/2001 | Ukigawa ................. G06Q 10/10 |
| 2014/0172784 A1 | 6/2014 | Choi et al. |
| 2018/0285588 A1* | 10/2018 | Gaikwad ............. G06F 21/6227 |

FOREIGN PATENT DOCUMENTS

| JP | 2006268816 A | * 10/2006 |
| JP | 2009-129239 A | 6/2009 |
| JP | 2019-168778 A | 10/2019 |

OTHER PUBLICATIONS

Jul. 17, 2023 Extended Search Report issued in European Patent Application No. 22199313.2.

* cited by examiner

Primary Examiner — Tarek Chbouki
(74) Attorney, Agent, or Firm — Oliff PLC

(57) ABSTRACT

An information processing apparatus includes a processor configured to: be capable of accessing a business-card management database storing multiple pieces of business-card management data, each piece of the business-card management data including, in association with each other, user identification information for identifying a user, the user's business-card information written on the user's business card, and information about at least one business-card exchange partner with whom the user exchanged business cards; receive selection of a predecessor from a successor who is one of the users and who takes over a job of the predecessor, the predecessor being one of the users; and notify information about the successor to the at least one business-card exchange partner of the predecessor, on the basis of the business-card management database.

6 Claims, 18 Drawing Sheets

FIG. 3

| USER ID | USER NAME | BUSINESS-CARD INFORMATION ||||||| BUSINESS-CARD INFORMATION UPDATE DATE AND TIME | BUSINESS-CARD EXCHANGE USER | BUSINESS-CARD INFORMATION OF BUSINESS-CARD EXCHANGE USER | BUSINESS-CARD EXCHANGE DATE AND TIME | MEMO |
|---|---|---|---|---|---|---|---|---|---|---|---|---|
| | | COMPANY NAME | DEPARTMENT NAME | JOB TITLE | NAME | TELEPHONE NUMBER | MAIL ADDRESS | | | | | |
| ⋮ | ⋮ | ⋮ | ⋮ | ⋮ | ⋮ | ⋮ | ⋮ | ⋮ | ⋮ | ⋮ | ⋮ | ⋮ |
| U1056 | TSUKIKO TAMAGAWA 1977 | FUJIFILM CORP. | FINANCIAL SERVICES DIVISION | DEPARTMENT MANAGER | TSUKIKO TAMAGAWA | xxx-xxxx-xxxx | xxx@xxx.jp | 2/1/2022 | U1559 | — | 9/2/2020 | xxxxxx |
| | | | | | | | | | | xxx | 10/3/2020 | xxxxxx |
| ⋮ | ⋮ | ⋮ | ⋮ | ⋮ | ⋮ | ⋮ | ⋮ | ⋮ | ⋮ | ⋮ | ⋮ | ⋮ |
| U1559 | KAWAHARA IN KAMAKURA CORP. | KAMAKURA CORP. | SALES DEPARTMENT | SECTION CHIEF | MIDORI KAWAHARA | xxx-xxxx-xxxx | xxx@xx.com | 7/14/2020 | U1056 | — | 9/2/2020 | — |
| ⋮ | ⋮ | ⋮ | ⋮ | ⋮ | ⋮ | ⋮ | ⋮ | ⋮ | ⋮ | ⋮ | ⋮ | ⋮ |
| U2064 | fujitarou | FUJIFILM CORP. | GENERAL AFFAIRS DEPARTMENT | DEPARTMENT MANAGER | TARO FUJI | xxx-xxxx-xxxx | xxx@xxx.jp | 2/1/2022 | U0054 | — | 10/9/2021 | — |
| ⋮ | ⋮ | ⋮ | ⋮ | ⋮ | ⋮ | ⋮ | ⋮ | ⋮ | ⋮ | ⋮ | ⋮ | ⋮ |

24

⋮

Hanako Edogawa
FUJI YELLOW Corp.
Sales Department First Division

Yukiko Yodogawa
FUJI YELLOW Corp.
Corporate Sales Department

Tsukiko Tamagawa
FUJIFILM Corp.
Financial Services Division

Yohei Oyama
FUJI RED Corp.
SE Department

Katsu Sato
FUJI BROWN Corp.
Sales Department Third Division

Taro Fuji is your successor.

Taro Fuji was informed that Taro Fuji is to exchange business cards with the following users.

Midori Kawahara
KAMAKURA Corp.
Sales Department
Business-card exchange
date and time: 9/2/2020
Three memos xxxxxxxxx
XXXXX
xxx Yayoi Akagi
ENOSHIMA Corp.
Audit Department
Business-card exchange
date and time: 2/10/2020
Zero memo xxxxxxxx
XXXX
xxxxx Home Notification of Successor Taro Fuji is Tsukiko Tamagawa's successor.
Exchange of business cards is recommended.

Tsukiko Tamagawa
FUJIFILM Corp.
Financial Services Division
Business-card exchange
date and time: 9/2/2020 xxxxxxxxx
XXXXX
xxx

Taro Fuji
FUJIFILM Corp.
General Affairs Department
Manager
Business-card exchange
date and time:

Exchange cards

Back

FIG. 11

Notification of Successor

Taro Fuji is Tsukiko Tamagawa's successor.
Exchange of business cards is recommended.

Tsukiko Tamagawa
FUJIFILM Corp.
Financial Services Division
Business-card exchange
date and time: 9/2/2020 xxxxxxxxx
XXXXX
xxx

Taro Fuji
FUJIFILM Corp.
General Affairs Department
Manager
Business-card exchange
date and time: 2/24/2020 xxxxxxxxx
XXXX
xxx     ← 72

Card-exchange completed   ← 76

Back

FIG. 12

Handover of Business Card

Tsukiko Tamagawa's clients are handed over.
Exchange of business cards with the clients is recommended.

Midori Kawahara
KAMAKURA Corp.
Sales Department
Business-card exchange
date and time:
Three memos

[Exchange cards] — 80

Yayoi Akagi
ENOSHIMA Corp.
Audit Department
Business-card exchange
date and time:
Zero memo

[Exchange cards] — 80

[Back]

Handover of Business Card

Tsukiko Tamagawa's clients are handed over.
Exchange of business cards with the clients is recommended.

Midori Kawahara
KAMAKURA Corp.
Sales Department
Business-card exchange
date and time:
Three memos Exchange cards ← 80

Yayoi Akagi
ENOSHIMA Corp.
Audit Department
Business-card exchange
date and time: 2/10/2020
Zero memo xxxxxxxx
XXXX
xxxxx ← 82

84 → *Your business card has been updated after the previous exchange.

Exchange cards ← 80

Back

FIG. 14

Handover of Business Card

Tsukiko Tamagawa's clients are handed over.
Exchange of business cards with the clients is recommended.

Midori Kawahara
KAMAKURA Corp.
Sales Department
Business-card exchange
date and time:
Three memos Exchange cards Yayoi Akagi
ENOSHIMA Corp.
Audit Department
Business-card exchange
date and time: 2/10/2020
Zero memo xxxxxxxx
XXXX
xxxxx Card-exchange completed — 86

Back

Hanako Edogawa
FUJI YELLOW Corp.
Sales Department First Division

Yukiko Yodogawa
FUJI YELLOW Corp.
Corporate Sales Department

Tsukiko Tamagawa
FUJIFILM Corp.
Financial Services Division

Yohei Oyama
FUJI RED Corp.
SE Department

Katsu Sato
FUJI BROWN Corp.
Sales Department Third Division

⋮

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-024948 filed Feb. 21, 2022.

BACKGROUND

(i) Technical Field

The present disclosure relates to an information processing apparatus and a non-transitory computer readable medium.

(ii) Related Art

In the related art, a business-card management system has been proposed. Such a business-card management system centrally manages various information, for example, business-card information written on business cards of multiple users, such as their names, their company names, and their job titles, and information about business-card exchange partners with whom the users exchanged business cards.

For example, Japanese Unexamined Patent Application Publication Nos. 2009-129239 and 2019-168778 disclose business-card management systems. When a user's business-card information is changed, for example, due to a personnel shift, the business-card management systems notify the user's changed business-card information to business-card exchange partners with whom the user exchanged business cards.

When a successor takes over a predecessor's job, business-card exchange partners, with whom the predecessor exchanged business cards, may want to know information about the successor, instead of or in addition to the predecessor's changed business-card information.

SUMMARY

Aspects of non-limiting embodiments of the present disclosure relate to a technique which enables business-card exchange partners, with whom a predecessor exchanged business cards, to grasp information about the predecessor's successor.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: be capable of accessing a business-card management database storing multiple pieces of business-card management data, each piece of the business-card management data including, in association with each other, user identification information for identifying a user, the user's business-card information written on the user's business card, and information about at least one business-card exchange partner with whom the user exchanged business cards; receive selection of a predecessor from a successor who is one of the users and who takes over a job of the predecessor, the predecessor being one of the users; and notify information about the successor to the at least one business-card exchange partner of the predecessor, on the basis of the business-card management database.

BRIEF DESCRIPTION OF THE DRAWINGS

Exemplary embodiment of the present disclosure will be described in detail based on the following figures, wherein:

FIG. 3 is a diagram illustrating an exemplary business-card management database (DB);

FIG. 8 is a diagram illustrating an exemplary approval confirmation screen provided to a predecessor;

FIG. 11 is a diagram illustrating a third example of a successor notification screen provided to a business-card exchange partner of a predecessor;

FIG. 12 is a diagram illustrating a first example of an approval completion screen provided to a successor;

FIG. 13 is a diagram illustrating a second example of an approval completion screen provided to a successor;

FIG. 14 is a diagram illustrating a third example of an approval completion screen provided to a successor;

FIG. 15 is a diagram illustrating an exemplary successor selection screen;

DETAILED DESCRIPTION

Figure 1:
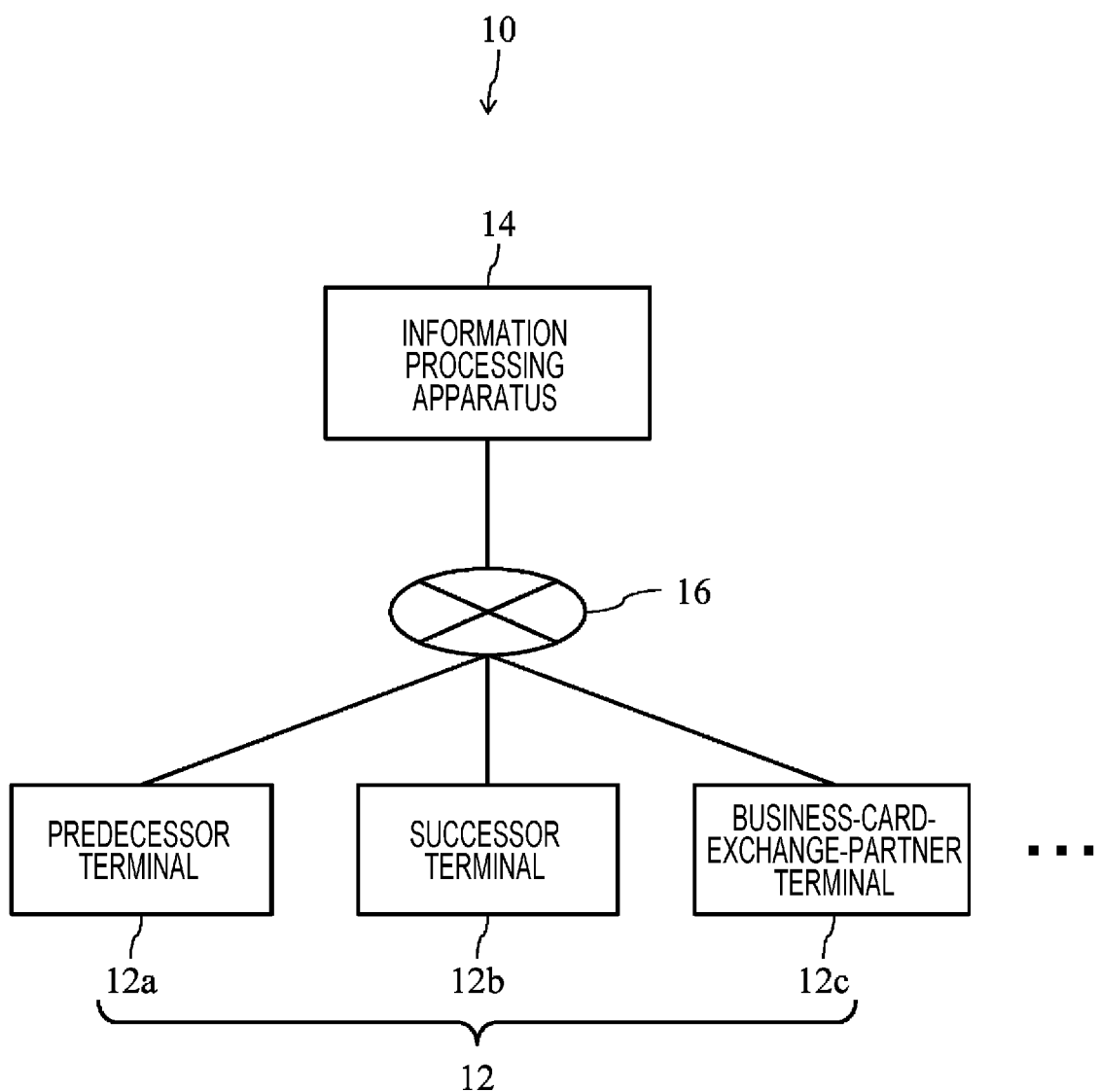
FIG. 1 is a schematic diagram illustrating the configuration of an information processing system according to the present exemplary embodiment.

FIG. 1 is a schematic diagram illustrating the configuration of an information processing system 10 according to the present exemplary embodiment. The information processing system 10 according to the present exemplary embodiment includes multiple user terminals 12 which are used by multiple users, and an information processing apparatus 14 which provides a business-card management service to the users. The user terminals 12 and the information processing apparatus 14 are connected to each other communicatively through a communication line 16, such as the Internet or a local area network (LAN). FIG. 1 illustrates, as the user terminals 12, a predecessor terminal 12a which is used by a predecessor, a successor terminal 12b which is used by a successor, and a business-card-exchange-partner terminal 12c which is used by a business-card exchange partner of the predecessor. The predecessor, the successor, and the business-card exchange partner will be described below.

Each user terminal 12 is formed, for example, of a computer, such as a personal computer, a tablet terminal, or a smartphone, but is not limited these apparatuses. Each user terminal 12 includes a communication interface for communicating with the information processing apparatus 14 through the communication line 16, an input interface for receiving an instruction from a user, a display on which, for example, screens provided by the information processing apparatus 14 are displayed, a memory for storing data, and a processor which performs processes.

Figure 2:
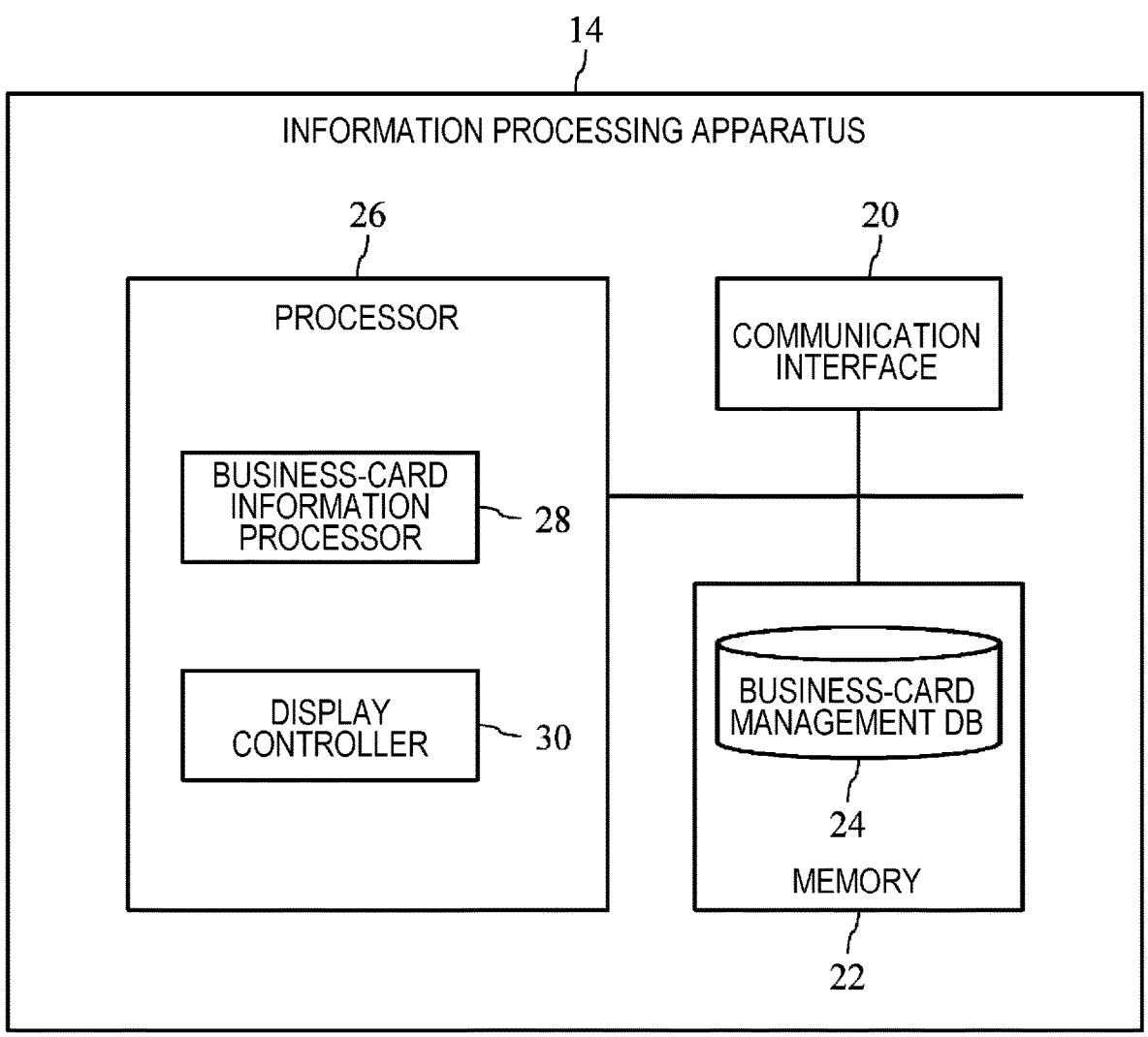
FIG. 2 is a schematic diagram of the configuration of an information processing apparatus according to the present exemplary embodiment.

FIG. 2 is a schematic diagram illustrating the configuration of the information processing apparatus 14 according to the present exemplary embodiment. In the present exemplary embodiment, the information processing apparatus 14 is a server computer. As long as the apparatus may function as described below (in other words, as long as the apparatus may provide a business-card management service described below), the information processing apparatus 14 may be any apparatus. The functions of the information processing apparatus 14 which are described below may be implemented in collaboration with multiple computers.

The information processing apparatus 14 provides a business-card management service for users. The business-card management service manages information, which is received from users who have been registered as users, and which is written on the users' business cards (in the specification, the information written on a business card is called "business-card information"). The business-card management service also manages business-card information of business-card exchange partners with whom the users exchanged business cards. A user's business-card exchange partner is not necessarily a user who has been registered as a user in the business-card management service. In the specification, a user, who has been registered as a user in the business-card management service, among the business-card exchange partners is called a "business-card exchange user".

Specifically, in user registration to the business-card management service, a user transmits business-card image data, which is obtained through photographing or scanning their own business card, to the information processing apparatus 14. Thus, in the business-card management service, the user's identification information (for example, a user ID or a unique user name) and the user's business-card information are registered. The business-card information may include, not only business-card image data itself, but also extracted character data (including numbers) obtained by analyzing the business-card image data.

In the business-card management service, a business-card exchange process may be performed. The business-card exchange process is a process for enabling a user to view the business-card information of the user's business-card exchange users. For example, assume user A and user B who have registered their business-card information in the business-card management service. When user A and user B have not performed the business-card exchange process in the business-card management service, user A is not allowed to view user B's business-card information, and user B is not allowed to view user A's business-card information. When the business-card management service performs the business-card exchange process between user A and user B, user A is allowed to view user B's business-card information, and user B is allowed to view user A's business-card information. In the present exemplary embodiment, the business-card exchange process in the business-card management service is performed when both user A and user B agree to do the process.

When a user and a business-card exchange partner exchange business cards by hand, not in the business-card management service, the business-card information of the business-card exchange partner may be registered in the business-card management service. For example, the user transmits, to the information processing apparatus 14, business-card image data obtained through photographing or scanning a business card of the business-card exchange partner. Thus, in the business-card management service, the business-card information of the business-card exchange partner is registered in association with the user.

The communication interface 20 is formed, for example, of a network interface card (NIC). The communication interface 20 functions to communicate with the user terminals 12 through the communication line 16.

A memory 22 includes a hard disk drive (HDD), a solid state drive (SSD), an embedded multi media card (eMMC), a read only memory (ROM), or a random access memory (RAM). The memory 22 stores information processing programs for operating the units of the information processing apparatus 14. The information processing programs may be stored in a computer-readable non-transitory storage medium, such as a Universal Serial Bus (USB) memory or a compact disc-read-only memory (CD-ROM). The information processing apparatus 14 may read the information processing programs from such a storage medium for execution.

As illustrated in FIG. 2, the memory 22 stores a business-card management database (DB) 24. The business-card management DB 24 stores business-card management data of each user who has been registered as a user in the business-card management service. FIG. 3 is a diagram illustrating an exemplary business-card management DB 24. FIG. 3 illustrates the business-card management DB 24 in a table format. One record indicates one piece of business-card management data (for a single user). As illustrated in FIG. 3, the business-card management data has, in association with each other, the user ID, the user name, the business-card information, the update date and time of the business-card information, the business-card exchange users, business-card information of the business-card exchange partners, the business-card exchange dates and times, and the memos. The business-card management DB 24 will be described below in detail with description about the process of a processor 26 (specifically, a business-card information processor 28).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As illustrated in FIG. 2, the processor 26 functions as the business-card information processor 28 and a display controller 30 according to the information processing programs stored in the memory 22.

For example, the business-card information processor 28 registers business-card management data in the business-card management DB 24, updates business-card management data registered in the business-card management DB 24, and performs the business-card exchange process in the business-card management service. The processes will be described below in detail.

When a user accesses the information processing apparatus 14 from their user terminal 12 to register themselves as a user in the business-card management service, the business-card information processor 28 obtains a user ID as user identification information for identifying the user uniquely, generates business-card management data, including the user ID, which is registered in the business-card management DB 24 (see FIG. 3). The business-card information processor 28 registers, in the business-card management DB 24, a user name, which is specified by the user in user registration, in association with the user ID. The user name may be used as user identification information for identifying the user uniquely. In this case, when a user specifies, in user registration, a user name, which has been already used by another user, the business-card information processor 28 does not register the user name, and may notify the user that the user name fails to be used. In the present exemplary embodiment, a user ID or a user name are used as user identification information. Alternatively, a single item or a combination of multiple items which are included in the business-card information described below may be used as user identification information.

When a user, who has been registered as a user, transmits, to the business-card management service, the user's business-card image data, the business-card information processor 28 registers, in the business-card management DB 24, the business-card image data as business-card information in association with the user ID of the user. In addition, the business-card information processor 28 analyzes the business-card image data to extract business-card information as character data, and registers the extracted business-card information as character data in the business-card management DB 24. The business-card information as character data may have multiple items. The example in FIG. 3 illustrates, as items of the business-card information, the company name, the department name, the job title, the name, the telephone number, and the mail address. As a matter of course, items in the business-card information are not limited to these.

The business-card information processor 28 performs a business-card information update process of updating business-card information registered in the business-card management DB 24. For example, when the information written on a business card is changed and the user transmits the business-card image data of a new business card to the business-card management service, the business-card information processor 28 associates the new business-card image data as business-card information with the user ID of the user in the business-card management DB 24. In addition, the business-card information processor 28 extracts character data from the new business-card image data, and associates the new business-card information as character data with the user ID of the user in the business-card management DB 24. The business-card information processor 28 may leave the past business-card information in the business-card management data of the user so as to grasp the user's past business careers.

The business-card information processor 28 registers, in the business-card management DB 24, the update date and time of the business-card information, which is a time at which the business-card information update process was performed, in association with the user ID of the user. That is, the update date and time of the business-card information is a date and time at which the user's business-card information was updated.

The business-card information processor 28 performs the business-card exchange process in which users exchange business cards with each other in the business-card management service. As described above, in the present exemplary embodiment, when two users in the business-card management service agree to exchange business cards, the business-card information processor 28 performs the business-card exchange process. In the business-card exchange process between user A and user B, the business-card information processor 28 registers, in the business-card management DB 24, the user ID of user B as user A's business-card exchange user in association with the user ID of user A. The business-card information processor 28 registers the user ID of user A as user B's business-card exchange user in association with the user ID of user B. As described above, the business-card exchange process allows user A to view the business-card information of user B, and allows user B to view the business-card information of user A. In addition, the business-card information processor 28 registers, in the business-card management DB 24, the business-card exchange date and time, which is a date and time at which the business-card exchange process was performed, in association with the user IDs (in the example above, user A and user B).

When a user transmits, to the business-card management service, business-card image data of a business-card exchange partner with whom the user exchanged business cards by hand, the business-card information processor 28 registers, in the business-card management DB 24, the business-card image data as the business-card information of the user's business-card exchange partner in association with the user ID of the user. In addition, the business-card information processor 28 registers, in the business-card management DB 24, the business-card information as character data, which is extracted from the business-card image data, as business-card information of the user's business-card exchange partner in association with the user ID of the user. In this case, the business-card information processor 28 regards the date and time, at which the business-card image data of the business-card exchange partner was received, as a date and time at which the user and the business-card exchange partner exchanged business cards, and registers, in the business-card management DB 24, the date and time, at which the business-card image data was received, as the business-card exchange date and time.

In the business-card management service, a user may leave a memo about the user's business-card exchange partner. When the user specifies a business-card exchange partner and inputs a memo in the business-card management service, the business-card information processor 28 stores, in the business-card management DB 24, the input memo in association with the user's user ID and the specified business-card exchange partner.

The display controller 30 displays, on the displays of the user terminals 12, various screens provided by the business-card management service. For example, in response to a request from a user, a screen, which displays a list of pieces of business-card information of the user's business-card exchange partners, is displayed on the display of the user terminal 12 used by the user.

In response to the successor's selection of a predecessor in the business-card management service or the predecessor's selection of a successor in the business-card management service, the display controller 30 notifies the predecessor's business-card exchange partners of information about the successor, on the basis of the business-card management DB 24. Both the predecessor and the successor are users in the business-card management service. The successor is a person who takes over the predecessor's job (for example, a job title).

By referring to FIGS. 4 to 17 as appropriate, the processes of the business-card information processor 28 and the display controller 30, particularly, the process of notifying a predecessor's business-card exchange partners of information about the predecessor's successor, will be described in detail.

Figure 4:
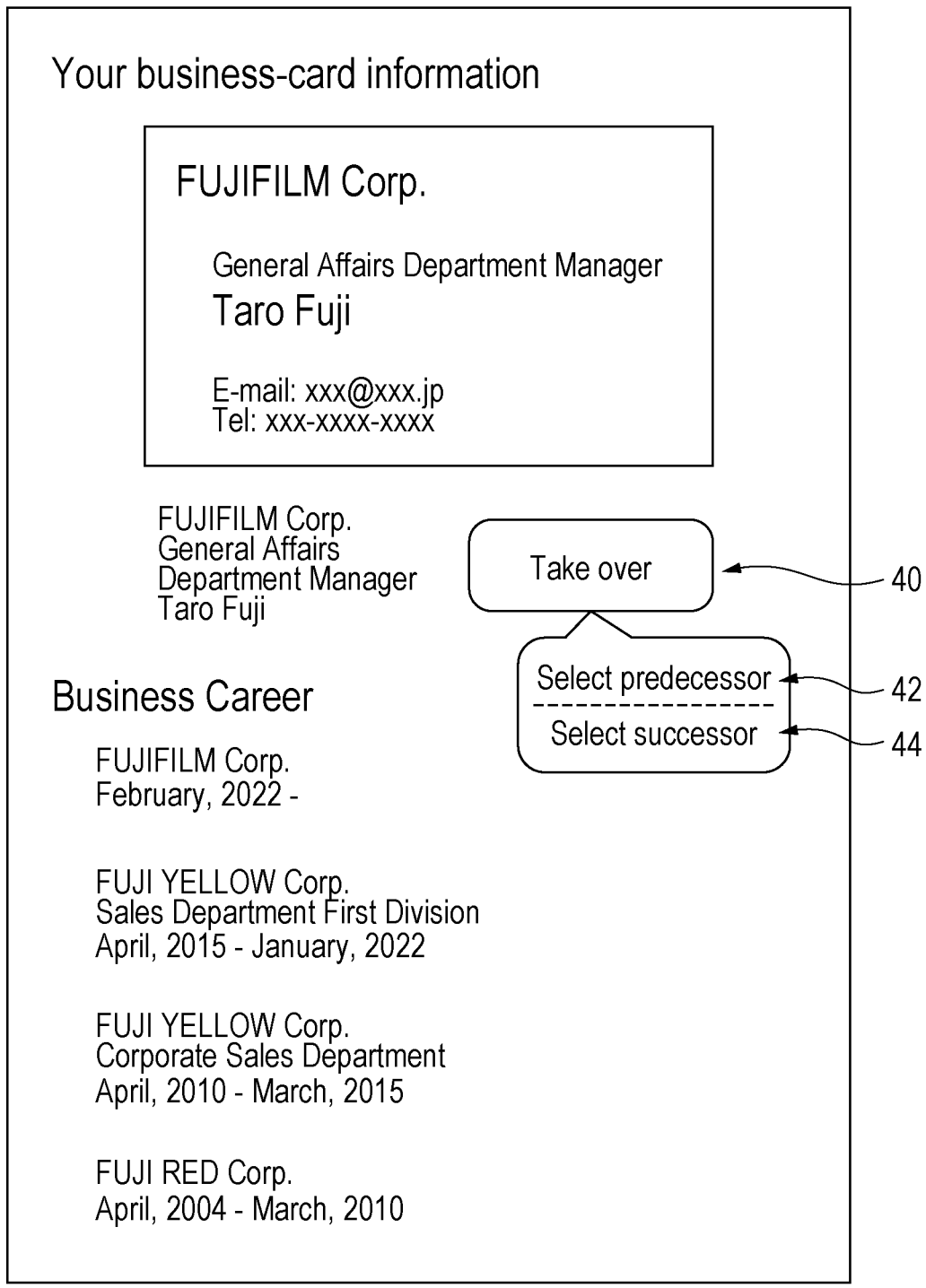
FIG. 4 is a diagram illustrating an exemplary screen provided by a business-card management service.

FIG. 4 is a diagram illustrating an exemplary screen provided by the business-card management service. The screen illustrated in FIG. 4 is displayed on the display of a user terminal 12. Specifically, when a user logs in the business-card management service by using their user terminal 12, the display controller 30 displays the screen, as illustrated in FIG. 4, on the display of the user terminal 12. FIG. 4 illustrates one of screens displayed by the display controller 30 on the display of a user terminal 12. The display controller 30 may display, on the display of a user terminal 12, various screens in addition to the screen illustrated in FIG. 4.

The screen in FIG. 4 displays the user's own business-card information and the user's past business careers. The display controller 30 authenticates a user, and thus obtains the user ID of the user. The display controller 30 specifies business-card management data, including the user ID, from the business-card management DB 24, and displays the user's own business-card information and the user's past business careers on the basis of the specified business-card management data.

The screen includes a takeover button 40. When a user operates the takeover button 40, the display controller 30 displays a predecessor selection button 42 and a successor selection button 44 on the screen. Herein, the case in which the user (in the example in FIG. 4, "Taro Fuji") is a successor, and in which the user who is a successor selects their predecessor will be described. Therefore, the screen in FIG. 4 is displayed on the display of the successor terminal 12b. As described below, the user may be a predecessor, and the user who is a predecessor may select their successor.

Figure 5:
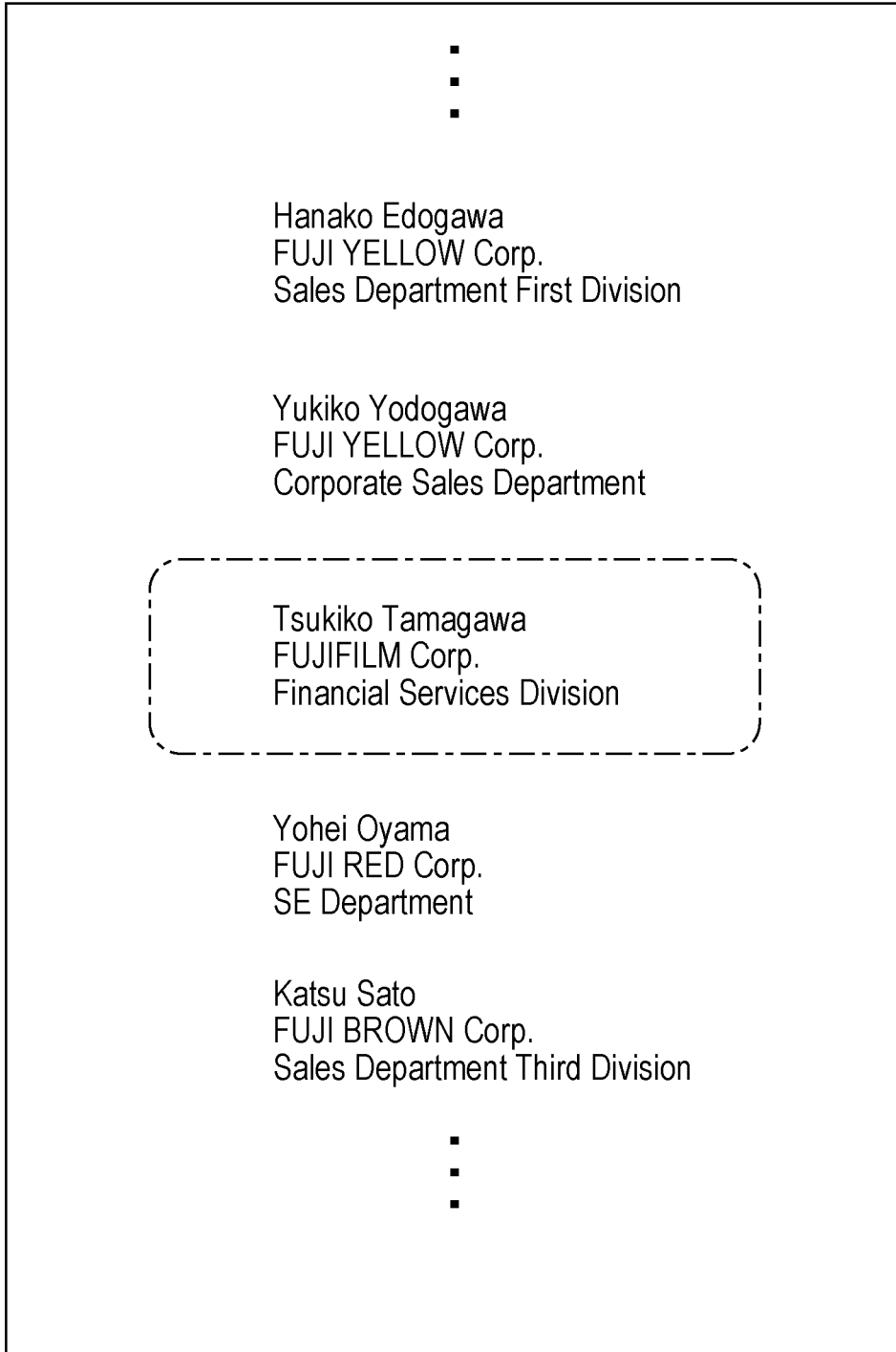
FIG. 5 is a diagram illustrating an exemplary predecessor selection screen.

When the successor operates the predecessor selection button 42, the display controller 30 displays, on the display of the successor terminal 12b, a predecessor selection screen 46 as illustrated in FIG. 5. In the example in FIG. 5, a list of users, who have been registered in the business-card management DB 24, is displayed on the predecessor selection screen 46. When a large number of users have been registered in the business-card management DB 24 and it is difficult to select a predecessor from the user list, a search box for searching a predecessor, for example, by using a predecessor name may be displayed on the predecessor selection screen 46. Alternatively, the display controller 30 may display, on the initial screen of the predecessor selection screen 46, only users, who have, as a past business career, the same combination as that of the successor's company name, the successor's department name, and the successor's job title, on the basis of the business-card management DB 24. In this example, Taro Fuji, who is a successor, selects "Tsukiko Tamagawa" as their predecessor on the predecessor selection screen 46.

When the successor selects their predecessor, information (for example, the user ID of the predecessor) indicating the selected predecessor is transmitted from the successor terminal 12b to the information processing apparatus 14. In response to reception of selection of a predecessor from the successor terminal 12b, the display controller 30 transmits, to the predecessor, an approval request for asking whether the predecessor's business-card exchange partners are to be notified of information about the successor.

Figure 6:
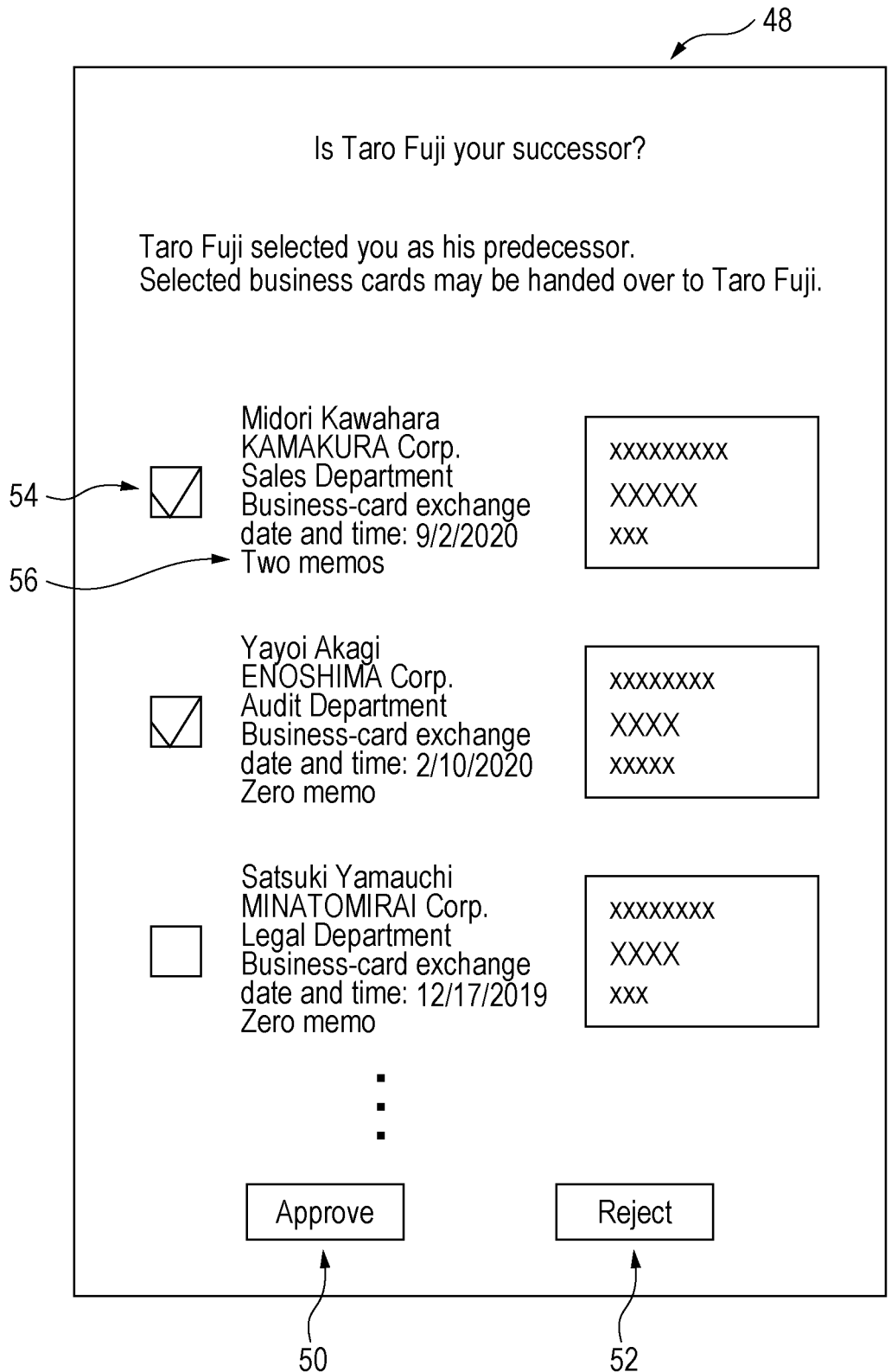
FIG. 6 is a diagram illustrating an exemplary approval request screen provided to a predecessor.

In the present exemplary embodiment, the display controller 30 displays an approval request screen 48, as illustrated in FIG. 6, on the display of the predecessor terminal 12a used by the predecessor, by using a known push notification technique. Thus, the display controller 30 notifies the predecessor of an approval request. The approval request screen 48 includes information about the successor (in the example in FIG. 6, "Taro Fuji") who has selected the predecessor, and an approve button 50 and a reject button 52. When the predecessor operates the approve button 50, approval information, which indicates that the predecessor has approved notification of information about the successor to the predecessor's business-card exchange partners, is transmitted from the predecessor terminal 12a to the information processing apparatus 14. In contrast, when the predecessor operates the reject button 52, rejection information, which indicates that the predecessor has rejected notification of information about the successor to the predecessor's business-card exchange partners, is transmitted from the predecessor terminal 12a to the information processing apparatus 14.

In the present exemplary embodiment, the approval request screen 48 includes a list of the business-card exchange partners of the predecessor, and check boxes 54 corresponding to the business-card exchange partners. The predecessor may check a check box 54 for selection on the approval request screen 48 to select the business-card exchange partner corresponding to the check box 54. The predecessor, who selects business-card exchange partners by using the corresponding check boxes 54, may notify only the selected business-card exchange partners of information about the successor. In other words, the predecessor may cause information about the successor not to be transmitted to the unselected business-card exchange partners. When the predecessor, who has selected some check boxes 54, operates the approve button 50, the approval information and information indicating the business-card exchange partners selected by the predecessor (the user IDs or business-card information of the business-card exchange partners) are transmitted from the predecessor terminal 12a to the information processing apparatus 14.

Figure 7:
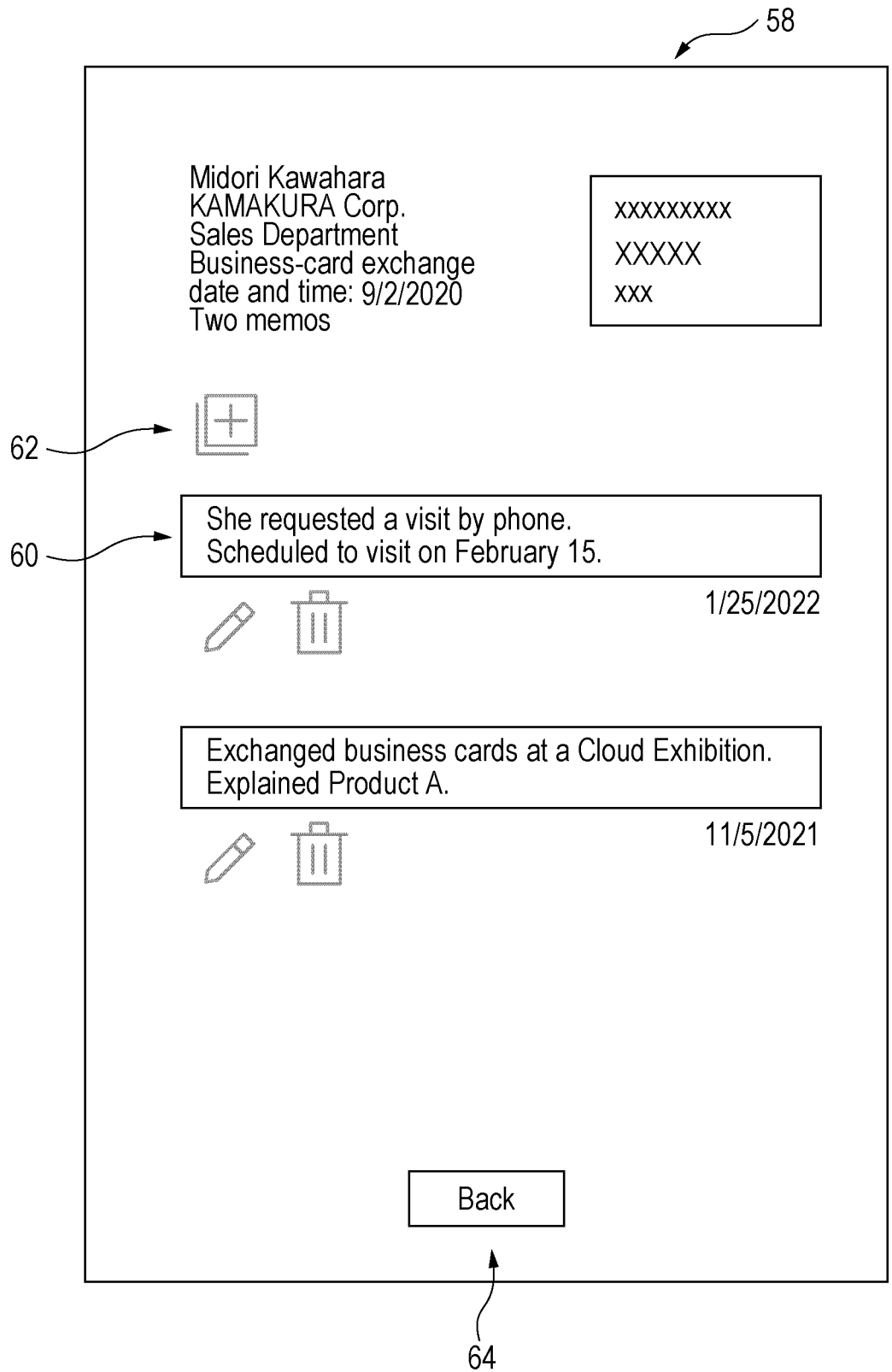
FIG. 7 is a diagram illustrating an exemplary memo edit screen.

The approval request screen 48 according to the present exemplary embodiment includes memo buttons 56 corresponding to the business-card exchange partners. When the predecessor operates a memo button 56, the display controller 30 displays a memo edit screen 58, as illustrated in FIG. 7, on the display of the predecessor terminal 12a. On the memo edit screen 58, memos 60 which were input by the predecessor are displayed for the business-card exchange partner (in the example in FIG. 7, "Midori Kawahara") corresponding to the memo button 56 operated by the predecessor. Specifically, when the predecessor operates a memo button 56, information indicating the business-card exchange partner corresponding to the memo button 56 is transmitted from the predecessor terminal 12a to the information processing apparatus 14. The display controller 30 refers to the business-card management DB 24, and specifies the memos 60 associated with the business-card exchange partner, about whom information is received by the information processing apparatus 14, in the business-card management data of the predecessor. The specified memos 60 are displayed on the memo edit screen 58. On the memo edit screen 58, the memos 60, which were input by the predecessor, may be edited.

The memo edit screen 58 according to the present exemplary embodiment includes a memo creation button 62. The predecessor, who operates the memo creation button 62, may create a new memo about the business-card exchange partner. A new memo created on the screen may be used as a message about the business-card exchange partner to the successor. For example, Tsukiko Tamagawa, who is the predecessor, may leave, as a new memo, a message to Taro Fuji, who is her successor, about Midori Kawahara, who is her business-card exchange partner.

The memo edit screen 58 includes a back button 64. When the predecessor operates the back button 64, the display controller 30 displays the approval request screen 48, which is illustrated in FIG. 6, again on the display of the predecessor terminal 12a.

On reception of approval information from the predecessor terminal 12a due to the predecessor's operation of the approve button 50 on the approval request screen 48, the display controller 30 displays an approval confirmation screen 66, as illustrated in FIG. 8, on the display of the predecessor terminal 12a. The approval confirmation screen 66 contains information indicating that the business-card management service receives the predecessor's approval of notification of information about the successor to the predecessor's business-card exchange partners. When the predecessor operates the reject button 52 and rejection information is received from the predecessor terminal 12a, the display controller 30 displays, on the display of the successor terminal 12b, a screen containing information indicating that the predecessor has rejected notification of information about the successor to the predecessor's business-card exchange partners. In this case, the display controller 30 does not perform the process, which is described below, of notifying information about the successor to the predecessor's business-card exchange partners.

Figure 9:
FIG. 9 is a diagram illustrating a first example of a successor notification screen provided to a business-card exchange partner of a predecessor.

On reception of approval information from the predecessor terminal 12a, the display controller 30 notifies information about the successor (in this example, "Taro Fuji") to the business-card exchange partners of the predecessor (in this example, "Tsukiko Tamagawa"). The information about a successor includes, typically, their name, their company name, their department name, and their job title. Specifically, the display controller 30 refers to the business-card management DB 24, and specifies the business-card exchange users of the predecessor. The display controller 30 uses a known push notification technique to display a successor notification screen 68, as illustrated in FIG. 9, on the display of the business-card-exchange-partner terminal 12c used by each business-card exchange user of the predecessor. The successor notification screen 68 displays information about the predecessor (in this example, "Tsukiko Tamagawa") and information about the successor (in this example, "Taro Fuji").

When the predecessor selects business-card exchange partners on the approval request screen 48 (see FIG. 6), the display controller 30 notifies the business-card exchange users, who are selected by the predecessor, of information about the successor. In other words, the display controller 30 does not notify the business-card exchange user, who are not selected by the predecessor, of information about the successor.

The processor 26 may also notify business-card exchange partners, who are not registered as users in the business-card management service, among the predecessor's business-card exchange partners. Specifically, when approval information is received from the predecessor terminal 12a, the processor 26 refers to the business-card management DB 24, and specifies the business-card information of such business-card exchange partners of the predecessor. The processor 26 notifies information about the successor to the business-card exchange partners on the basis of contact information (for example, mail addresses or telephone numbers) of the business-card exchange partners in the specified business-card information. Specifically, the processor 26 may transmit mail describing the predecessor and the successor, to the mail addresses of the business-card exchange partners. Alternatively, the processor 26 may transmit a message describing the predecessor and the successor, to the business-card-exchange-partner terminals 12c used by the business-card exchange partners, by using the telephone numbers of the business-card exchange partners.

As described above, the processor 26 notifies the predecessor's business-card exchange partners of information about the successor. Thus, the business-card exchange partners may grasp information about the successor. In the exemplary embodiment above, when the predecessor gives approval, the processor 26 notifies the predecessor's business-card exchange partners of information about the successor. Alternatively, for example, in view of reduction in time and labor of the predecessor, the predecessor's business-card exchange partners may be notified of information about the successor without the predecessor's approval. Specifically, in response to reception of selection of a predecessor from the successor terminal 12b, the processor 26 may notify the predecessor's business-card exchange partners of information about the successor without transmission of an approval request to the predecessor.

As illustrated in FIG. 9, the successor notification screen 68 may include an exchange business-card button 70. When a business-card exchange user of the predecessor operates the exchange business-card button 70, a business-card exchange request to the successor from the business-card exchange user is transmitted from the business-card-exchange-partner terminal 12c, which is used by the business-card exchange user, to the information processing apparatus 14. The business-card exchange request is information for requesting a business-card exchange process with the successor in the business-card management service. Transmission of the business-card exchange request indicates that the business-card exchange user agrees to perform the business-card exchange process with the successor.

In some cases, a business-card exchange user of the predecessor has already exchanged business cards with the successor. In this case, it may be unnecessary to perform the business-card exchange process between the business-card exchange user and the successor again. However, when the business-card information of either one or both of the business-card exchange user and the successor has been changed after the business-card exchange user and the successor exchanged business cards, it is better to perform the business-card exchange process gain.

Therefore, the display controller 30 refers to the business-card management DB 24, and determines whether the successor and the business-card exchange user exchanged business cards, on the basis of the business-card management data of the successor or the business-card exchange user. If the successor and the business-card exchange user did not exchange business cards, a successor notification screen 68a, which is illustrated in FIG. 9, may be displayed on the display of the business-card-exchange-partner terminal 12c. In contrast, if the successor and the business-card exchange user exchanged business cards, the display controller 30 refers to the business-card management data of the successor, and compares the update date and time of the successor's business-card information with the business-card exchange date and time of the business-card exchange with the business-card exchange user. In addition, the display controller 30 refers to the business-card management data of the business-card exchange user, and compares the update date and time of the business-card information of the business-card exchange user with the business-card exchange date and time of the business-card exchange with the successor. If at least one of the following conditions is satisfied, the display controller 30 displays a successor notification screen 68b, which is illustrated in FIG. 10, on the display of the business-card-exchange-partner terminal 12c: the condition that the update date and time of the successor's business-card information is later than the business-card exchange date and time; the condition that the update date and time of the business-card information of the business-card exchange user is later than the business-card exchange date and time.

Figure 10:
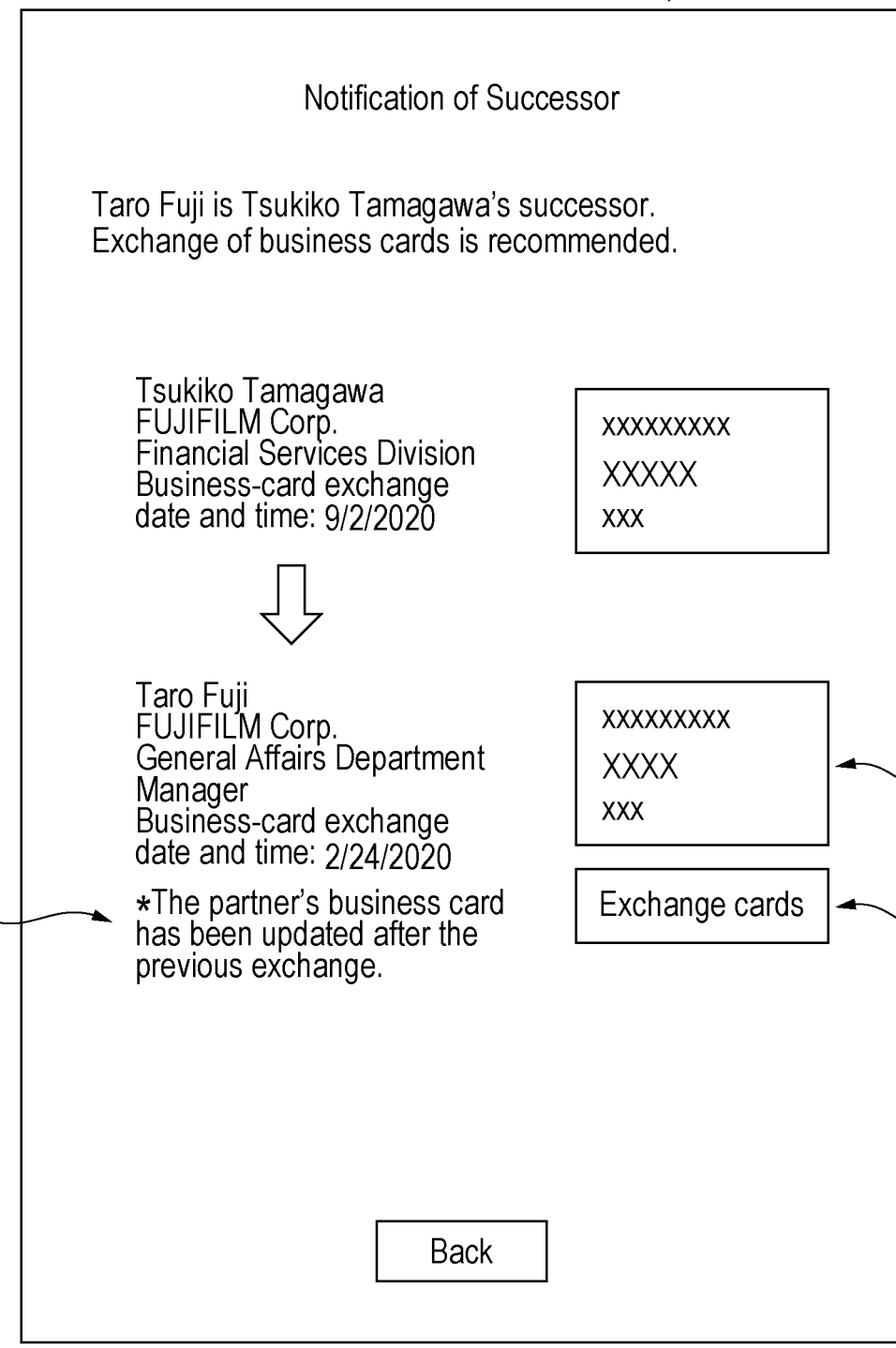
FIG. 10 is a diagram illustrating a second example of a successor notification screen provided to a business-card exchange partner of a predecessor.

Like the successor notification screen 68a illustrated in FIG. 9, the successor notification screen 68b in FIG. 10 includes the exchange business-card button 70. In addition, the successor notification screen 68b includes business-card information 72 of the successor which was obtained when the business-card exchange user exchanged business cards with the successor. Thus, the business-card exchange user may grasp that the business-card exchange user exchanged business cards with the successor.

The successor notification screen 68b includes a message 74 indicating the reason why the business-card exchange user is to exchange business cards with the successor again. The example in FIG. 10 indicates the case in which the business-card information of the successor has been changed after the business-card exchange user and the successor exchanged business cards. The message 74 is "The business card of your partner has been updated after the previous business-card exchange." If the business-card information of the business-card exchange user has been changed after the business-card exchange user and the successor exchanged business cards, the message 74 is, for example, "Your business card has been updated after the previous business-card exchange." If the business-card information of the business-card exchange user and that of the successor have been changed after the business-card exchange user and the successor exchanged business cards, the message 74 is, for example, "Your partner's business card and your business card have been updated after the previous business-card exchange."

If the successor and the business-card exchange user exchanged business cards, and if the business-card information of the successor and that of the business-card exchange user have not been changed after the business-card exchange date and time of the business-card exchange, it may be unnecessary to perform the business-card exchange process between the business-card exchange user and the successor again. Therefore, the display controller 30 refers to the business-card management DB 24. If both the following conditions are satisfied, the display controller 30 displays a successor notification screen 68c, which is illustrated in FIG. 11, on the display of the business-card-exchange-partner terminal 12c: the condition that the business-card information of the successor has not been updated, or the update date and time of the successor's business-card information is before the business-card exchange date and time; the condition that the business-card information of the business-card exchange user has not been updated, or the update date and time of the business-card information of the business-card exchange user is before the business-card exchange date and time.

The successor notification screen 68c illustrated in FIG. 11 includes the business-card information 72 of the successor which was obtained when the business-card exchange user exchanged business cards with the successor. Thus, the business-card exchange user may grasp that the business-card exchange user exchanged business cards with the successor. The successor notification screen 68c includes a business-card exchange-completed icon 76, which indicates that the business-card exchange user exchanged business cards with the successor and does not need to exchange business cards with the successor. Thus, the business-card exchange user may grasp that the business-card exchange user does not need to exchange business cards with the successor. The successor notification screen 68c does not include the exchange business-card button 70. Therefore, the business-card exchange user is not allowed to transmit a business-card exchange request to the successor from the successor notification screen 68c.

On reception of approval information from the predecessor terminal 12a, the display controller 30 notifies the successor of the predecessor's approval. Specifically, the display controller 30 displays an approval completion screen 78, as illustrated in FIG. 12, on the display of the successor terminal 12b.

The approval completion screen 78 describes that the predecessor approves transmission of notification of information about the successor to the predecessor's business-card exchange partners. As in an approval completion screen 78a illustrated in FIG. 12, the approval completion screen 78 may include a list of the business-card exchange users, who are users of the business-card management service (that is, users registered in the business-card management DB 24) among the predecessor's business-card exchange partners, and may also include exchange business-card buttons 80 corresponding to the business-card exchange users. When the successor operates an exchange business-card button 80, the successor transmits a business-card exchange request to the business-card exchange user corresponding to the selected exchange business-card button 80, from the successor terminal 12b to the information processing apparatus 14. The business-card exchange request is information for requesting for execution of the business-card exchange process between the business-card exchange user and the successor in the business-card management service. Transmission of the business-card exchange request indicates the successor's agreement on execution of the business-card exchange process with the business-card exchange user.

Like the successor notification screen 68 (see FIGS. 9 to 11), the display controller 30 changes the approval completion screen 78 displayed on the display of the successor terminal 12b, in accordance with, for each of the business-card exchange users of the predecessor, whether the business-card exchange user exchanged business cards with the successor, or whether either one or both of the business-card information of the business-card exchange user and that of the successor has been changed after the business-card exchange user and the successor exchanged business cards.

The display controller 30 refers to the business-card management DB 24, and determines, for each of the business-card exchange users of the predecessor, whether the business-card exchange user exchanged business cards with the successor, on the basis of the business-card management data of the successor. As in an approval completion screen 78*b* illustrated in FIG. 13, for the predecessor's business-card exchange user ("Midori Kawahara" in FIG. 13) who has not exchanged business cards with the successor, the display controller 30 displays an exchange business-card button 80 corresponding to the business-card exchange user. In contrast, for the predecessor's business-card exchange user ("Yayoi Akagi" in FIG. 13) who exchanged business cards with the successor, the display controller 30 refers to the business-card management data of the successor, and compares the update date and time of the successor's business-card information with the business-card exchange date and time of the business-card exchange with the business-card exchange user. In addition, the display controller 30 refers to the business-card management data of the business-card exchange user, and compares the update date and time of the business-card information of the business-card exchange user with the business-card exchange date and time of the business-card exchange with the successor. If at least one of the following conditions is satisfied, the display controller 30 displays the exchange business-card button 80 corresponding to the business-card exchange user as in the approval completion screen 78*b*: the condition that the update date and time of the successor's business-card information is later than the business-card exchange date and time; the condition that the update date and time of the business-card information of the business-card exchange user is later than the business-card exchange date and time.

In addition, the display controller 30 displays business-card information 82 of the business-card exchange user which was obtained when the successor exchanged business cards with the business-card exchange user. Thus, the successor may grasp that the successor exchanged business cards with the business-card exchange user. Further, the display controller 30 displays a message 84 indicating the reason why the successor is to exchange business cards with the business-card exchange user again. The example in FIG. 13 indicates the case in which the successor's business-card information has been changed after the business-card exchange user and the successor exchanged business cards. The message 84 is "Your business card has been updated after the previous business-card exchange." If the business-card information of the business-card exchange user has been changed after the business-card exchange user and the successor exchanged business cards, the message 84 is, for example, "Your partner's business card has been updated after the previous business-card exchange." If the business-card information of the business-card exchange user and that of the successor have been changed after the business-card exchange user and the successor exchanged business cards, the message 84 is, for example, "Your partner's business card and your business card have been updated after the previous business-card exchange."

If a business-card exchange user exchanged business cards with the successor, and if the business-card information of the successor and the business-card information of the business-card exchange user have not been changed after the business-card exchange date and time of the business-card exchange, it may be unnecessary to perform the business-card exchange process between the business-card exchange user and the successor again. Therefore, the display controller 30 refers to the business-card management DB 24; if both the following conditions are satisfied, as in an approval completion screen 78*c* in FIG. 14, the display controller 30 displays a business-card exchange-completed icon 86, corresponding to a business-card exchange user (in FIG. 14, "Yayoi Akagi"), which indicates that the successor does not need to exchange business cards with the business-card exchange user: the condition that the business-card information of the successor has not been updated, or the update date and time of the successor's business-card information is before the business-card exchange date and time; the condition that the business-card information of the business-card exchange user has not been updated, or the update date and time of the business-card information of the business-card exchange user is before the business-card exchange date and time. Thus, the successor may grasp that the successor does not need to exchange business cards with the business-card exchange user again. The display controller 30 does not display the exchange business-card button 80 corresponding to the business-card exchange user. Therefore, the successor is not allowed to transmit a business-card exchange request to the business-card exchange user.

The predecessor's business-card exchange user operates the exchange business-card button 70 on the successor notification screen 68 (FIG. 9 or 10), and transmits a business-card exchange request to the information processing apparatus 14. In addition, the successor operates the exchange business-card button 80 corresponding to the business-card exchange user on the approval completion screen 78 (FIGS. 12 to 14), and transmits a business-card exchange request to the information processing apparatus 14. In this case, the business-card information processor 28 performs the business-card exchange process between the business-card exchange user and the successor. Thus, in the business-card management service, the successor is allowed to view the business-card information of the business-card exchange user, and the business-card exchange user is allowed to view the business-card information of the successor.

As described above, if the successor and the predecessor's business-card exchange user exchanged business cards, and if the business-card information of the successor and that of the business-card exchange user have not been changed after the business-card exchange date and time of the business-card exchange, the exchange business-card button 70 is not displayed on the successor notification screen 68. Similarly, if the successor and the predecessor's business-card exchange user exchanged business cards, and if the business-card information of the successor and that of the business-card exchange user have not been changed after the business-card exchange date and time of the business-card exchange, the exchange business-card button 80 corresponding to the business-card exchange user is not displayed on the approval completion screen 78. Therefore, if the successor and the predecessor's business-card exchange user exchanged business cards, and if the business-card information of the successor and that of the business-card exchange user have not been changed after the business-card exchange date and time of the business-card exchange, both the successor and the business-card exchange user are not allowed to transmit business-card exchange requests. Thus, the business-card information processor 28 does not perform the business-card exchange process between the business-card exchange user and the successor.

In the exemplary embodiment above, in response to the successor's selection of a predecessor, the display controller 30 notifies the predecessor's business-card exchange partners of information about the successor. Alternatively, in response to the predecessor's selection of a successor, the display controller 30 may notify the predecessor's business-card exchange partners of information about the successor.

In this case, when the predecessor uses the predecessor terminal 12a to log in the business-card management service, the display controller 30 displays a screen, as illustrated in FIG. 4, on the display of the predecessor terminal 12a. In this example, assume that "Taro Fuji" is a predecessor. The predecessor operates the takeover button 40 to display the predecessor selection button 42 and the successor selection button 44. When the predecessor selects the successor selection button 44, the display controller 30 displays a successor selection screen 88, which is illustrated in FIG. 15, on the display of the predecessor terminal 12a.

Figure 16:
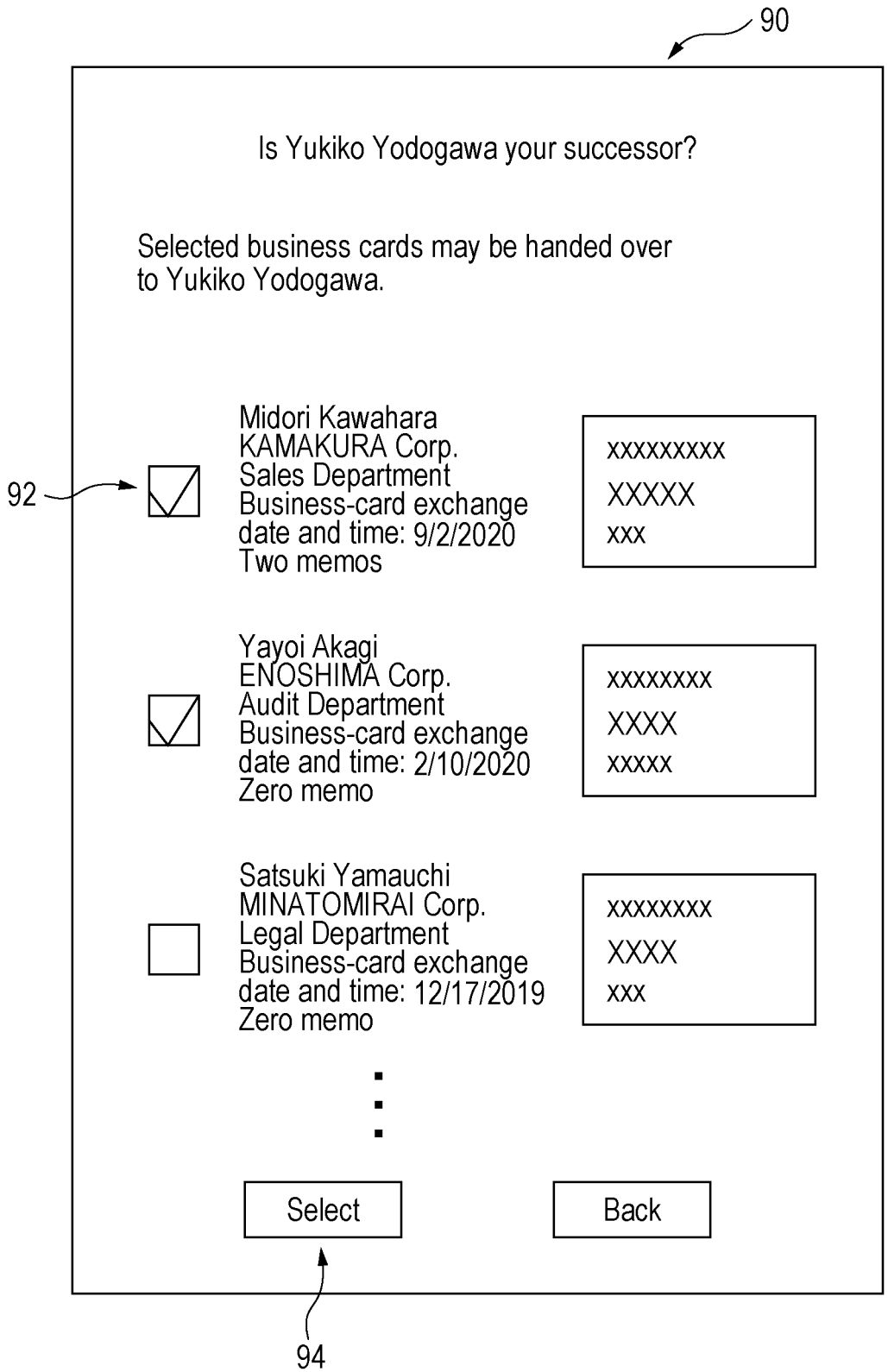
FIG. 16 is a diagram illustrating an exemplary business-card-exchange-partner selection screen.

When the predecessor selects a successor on the successor selection screen 88 (in this example, assume that "Yukiko Yodogawa" is selected), the display controller 30 displays a business-card-exchange-partner selection screen 90, which is illustrated in FIG. 16, on the display of the predecessor terminal 12a.

Like the approval request screen 48 (see FIG. 6), the business-card-exchange-partner selection screen 90 includes a list of the predecessor's business-card exchange partners, check boxes 92, which correspond to the business-card exchange partners and which are used to select the corresponding business-card exchange partners. When the predecessor checks check boxes 92 and operates a select button 94, information indicating the selected successor and information indicating the business-card exchange partners selected by the predecessor are transmitted from the predecessor terminal 12a to the information processing apparatus 14.

In response to the predecessor's selection of a successor, the display controller 30 transmits, to the successor, a notification about an approval request to ask whether information about the successor may be notified to the predecessor's business-card exchange partners. If the successor approves the notification, the processor 26 notifies the business-card exchange partners, who are selected by the predecessor, of information about the successor. Even in this case, without the successor's approval, information about the successor may be notified to the predecessor's business-card exchange partners.

The other processes (for example, the process of notifying information about the successor only to the business-card exchange partners selected by the predecessor, and the business-card exchange process between the predecessor's business-card exchange users and the successor), which are performed in the case in which the predecessor selects a successor, are substantially the same as those performed in the case in which the successor selects a predecessor.

Figure 17:
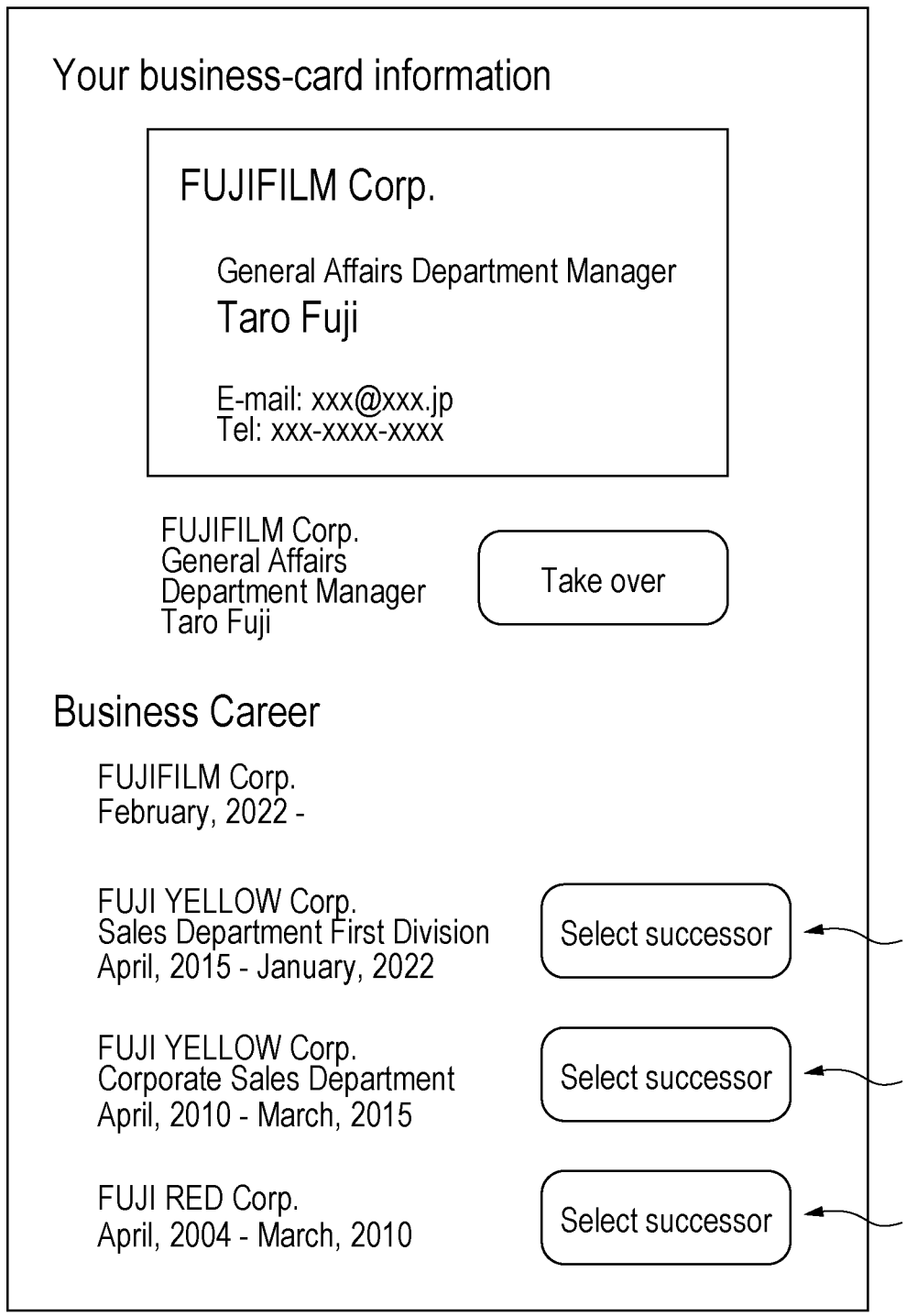
FIG. 17 is a diagram illustrating an exemplary screen on which a successor is capable of being selected for each past job.

When the predecessor selects a successor, the predecessor may select, not only a successor of the predecessor's current job, but also successors of the predecessor's past jobs. For example, the display controller 30 displays a screen, which is illustrated in FIG. 17, on the display of the predecessor terminal 12a. The screen includes successor selection buttons 96 corresponding to the predecessor's past jobs. The predecessor may operate a successor selection button 96 to select a successor of their past job.

When the predecessor operates a successor selection button 96, the display controller 30 displays the successor selection screen 88 (see FIG. 15) on the display of the predecessor terminal 12a. When the predecessor selects a successor on the successor selection screen 88, the display controller 30 displays the business-card-exchange-partner selection screen 90, as described in the exemplary embodiment above. However, in this case, on the business-card-exchange-partner selection screen 90, the check boxes 92 corresponding to the business-card exchange partners, with whom the predecessor exchanged business cards in the period in which the predecessor did the past job corresponding to the successor selection button 96 selected by the predecessor, may be selectable in the initial display.

Figure 18:
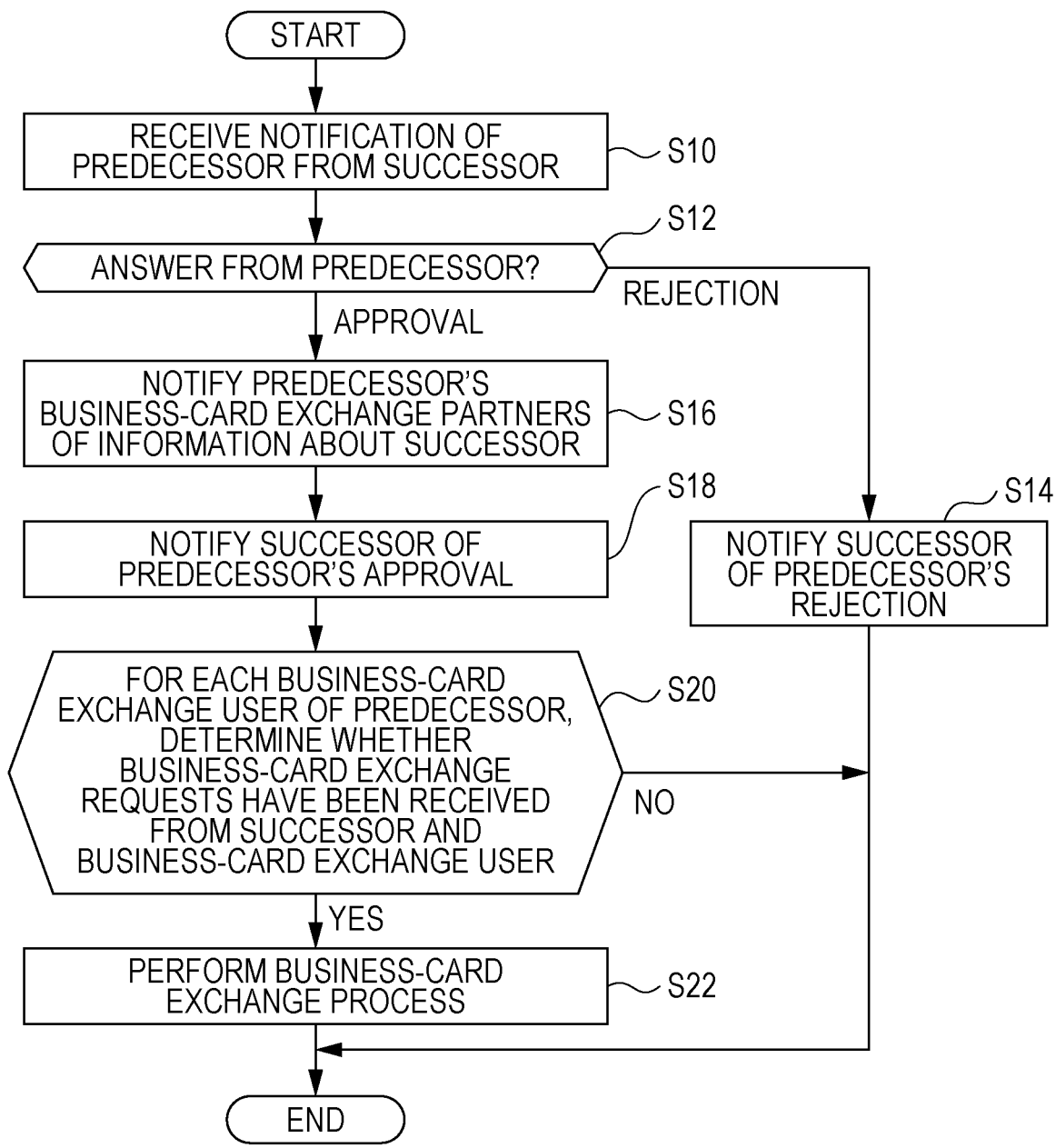
FIG. 18 is a flowchart of a process performed by an information processing apparatus according to the present exemplary embodiment.

The configuration of the information processing apparatus 14 according to the present exemplary embodiment is described above. According to the flowchart in FIG. 18, the flow of the process of the information processing apparatus 14 according to the present exemplary embodiment will be described below.

In step S10, a successor logs in a business-card management service, and selects a predecessor on the predecessor selection screen 46 (see FIG. 5) displayed on the display of the successor terminal 12b. The information processing apparatus 14 receives, from the successor terminal 12b, information about the selected predecessor.

In step S12, the display controller 30 displays the approval request screen 48 on the display of the predecessor terminal 12a. The display controller 30 determines the predecessor's answer about the approval request screen 48. If rejection information, which indicates that the predecessor rejects notification of information about the successor to the predecessor's business-card exchange partners, is received from the predecessor terminal 12a, the process proceeds to step S14. If approval information, which indicates that the predecessor approves notification of information about the successor to the predecessor's business-card exchange partners, is received from the predecessor terminal 12a, the process proceeds to step S16.

In step S14, the display controller 30 displays a screen, including information indicating that the predecessor rejects notification of information about the successor to the predecessor's business-card exchange partners, on the display of the successor terminal 12b, and the process ends.

In step S16, the display controller 30 notifies the predecessor's business-card exchange partners of information about the successor. Specifically, the display controller 30 displays the successor notification screen 68 (see FIG. 9) on the display of the business-card-exchange-partner terminal 12c used by each business-card exchange user of the predecessor.

In step S18, the display controller 30 notifies the successor of the predecessor's approval. Specifically, the display controller 30 displays the approval completion screen 78 (see FIG. 12) on the display of the successor terminal 12b.

In step S20, for each business-card exchange user of the predecessor, the business-card information processor 28 determines whether business-card exchange requests have been received from both the successor and the business-card exchange user. Specifically, the business-card information processor 28 determines whether both the following conditions are satisfied for each business-card exchange user of the predecessor; the condition that a business-card exchange request, which is transmitted by the predecessor's business-card exchange user operating the exchange business-card button 70 on the successor notification screen 68 (see FIGS. 9 to 10), is received from the business-card-exchange-partner terminal 12c; the condition that a business-card exchange request, which is transmitted by the successor operating the exchange business-card button 80 corresponding to the business-card exchange user on the approval completion screen 78 (see FIGS. 12 to 14), is received from the successor terminal 12b. If the business-card exchange requests are received from both the successor and the business-card exchange user, the process proceeds to step S22. If not, the process ends.

In step S22, the business-card information processor 28 performs the business-card exchange process between the successor and the business-card exchange user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
be capable of accessing a business-card management database storing a plurality of pieces of business-card management data, each piece of the business-card management data including, in association with each other, user identification information for identifying a user, the user's business-card information written on the user's business card, and information about at least one business-card exchange partner with whom the user exchanged business cards;
receive selection of a predecessor from a successor who is one of the plurality of users and who takes over a job of the predecessor, the predecessor being one of the plurality of users;
notify the successor of information about a business-card exchange user among the at least one business-card exchange partner of the predecessor, the business-card exchange user being a registered user in the business-card management database;
in response to a request from the successor and a request from the business-card exchange user of the predecessor, perform a business-card exchange process between the successor and the business-card exchange user of the predecessor,
wherein each piece of the business-card management data further includes a business-card exchange date and time at which business cards were exchanged with the business-card exchange user, and an update date and time at which the business-card information was updated,
wherein, if the successor and the business-card exchange user of the predecessor exchanged business cards, and if the business-card information of the successor and the business-card information of the business-card exchange user of the predecessor have not been changed after the business-card exchange date and time of the business-card exchange, the business-card exchange process is not performed; and
notify information about the successor to the at least one business-card exchange partner of the predecessor, on a basis of the business-card management database.

2. The information processing apparatus according to claim 1,
wherein the processor is configured to:
in response to reception of selection of the predecessor from the successor, notify an approval request to the predecessor; and
in response to the predecessor's approval for the approval request, notify information about the successor to the at least one business-card exchange partner of the predecessor.

3. The information processing apparatus according to claim 2,
wherein the processor is configured to:
notify the successor of information about a business-card exchange user among the at least one business-card exchange partner of the predecessor, the business-card exchange user being a registered user in the business-card management database; and
in response to a request from the successor and a request from the business-card exchange user of the predecessor, perform a business-card exchange process between the successor and the business-card exchange user of the predecessor.

4. The information processing apparatus according to claim 3,
wherein each piece of the business-card management data further includes a business-card exchange date and time at which business cards were exchanged with the business-card exchange user, and an update date and time at which the business-card information was updated, and
wherein, if the successor and the business-card exchange user of the predecessor exchanged business cards, and if the business-card information of the successor and the business-card information of the business-card exchange user of the predecessor have not been changed after the business-card exchange date and time of the business-card exchange, the business-card exchange process is not performed.

5. A non-transitory computer readable medium storing a program causing a computer to execute a process for information processing, the process comprising:
accessing a business-card management database storing a plurality of pieces of business-card management data, each piece of the business-card management data including, in association with each other, user identification information for identifying a user, the user's business-card information written on the user's business card, and information about at least one business-card exchange partner with whom the user exchanged business cards;
receiving selection of a predecessor from a successor who is one of the plurality of users and who takes over a job of the predecessor, the predecessor being one of the plurality of users;
notifying the successor of information about a business-card exchange user among the at least one business-card exchange partner of the predecessor, the business-card exchange user being a registered user in the business-card management database;
in response to a request from the successor and a request from the business-card exchange user of the predecessor, performing a business-card exchange process between the successor and the business-card exchange user of the predecessor, wherein each piece of the business-card management data further includes a business-card exchange date and time at which business cards were exchanged with the business-card exchange user, and an update date and time at which the business-card information was updated, wherein, if the successor and the business-card exchange user of the predecessor exchanged business cards, and if the business-card information of the successor and the business-card information of the business-card exchange user of the predecessor have not been changed after the business-card exchange date and time of the business-card exchange, the business-card exchange process is not performed; and notifying information about the successor to the at least one business-card exchange partner of the predecessor, on a basis of the business-card management database.

6. A non-transitory computer readable medium storing a program causing a computer to execute a process for information processing, the process comprising:

accessing a business-card management database storing a plurality of pieces of business-card management data, each piece of the business-card management data including, in association with each other, user identification information for identifying a user, the user's business-card information written on the user's business card, and information about at least one business-card exchange partner with whom the user exchanged business cards;

receiving selection of a successor from a predecessor who is one of the plurality of users, the successor taking over a job of the predecessor and being one of the plurality of users;

notifying the successor of information about a business-card exchange user among the at least one business-card exchange partner of the predecessor, the business-card exchange user being a registered user in the business-card management database;

in response to a request from the successor and a request from the business-card exchange user of the predecessor, performing a business-card exchange process between the successor and the business-card exchange user of the predecessor, wherein each piece of the business-card management data further includes a business-card exchange date and time at which business cards were exchanged with the business-card exchange user, and an update date and time at which the business-card information was updated, wherein, if the successor and the business-card exchange user of the predecessor exchanged business cards, and if the business-card information of the successor and the business-card information of the business-card exchange user of the predecessor have not been changed after the business-card exchange date and time of the business-card exchange, the business-card exchange process is not performed; and notifying information about the successor to the at least one business-card exchange partner of the predecessor, on a basis of the business-card management database.

* * * * *